(12) United States Patent
Shimoi

(10) Patent No.: US 7,678,480 B2
(45) Date of Patent: Mar. 16, 2010

(54) FUEL CELL SYSTEM

(75) Inventor: Ryoichi Shimoi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 27 days.

(21) Appl. No.: 11/575,451

(22) PCT Filed: Aug. 19, 2005

(86) PCT No.: PCT/JP2005/015489

§ 371 (c)(1),
(2), (4) Date: Mar. 16, 2007

(87) PCT Pub. No.: WO2006/030614

PCT Pub. Date: Mar. 23, 2006

(65) Prior Publication Data

US 2008/0044703 A1   Feb. 21, 2008

(30) Foreign Application Priority Data

Sep. 16, 2004   (JP) ............... 2004-269341

(51) Int. Cl.
*H01M 8/04* (2006.01)
*H01M 8/10* (2006.01)

(52) U.S. Cl. .................. 429/23; 429/22; 429/24; 429/34; 429/13; 429/19; 429/30; 429/25

(58) Field of Classification Search ............... None
See application file for complete search history.

(56) References Cited

U.S. PATENT DOCUMENTS

| 6,635,370 B2 | 10/2003 | Condit et al. |
| 2003/0186093 A1 | 10/2003 | St-Pierre et al. |
| 2004/0115495 A1* | 6/2004 | Asai et al. ............. 429/22 |

FOREIGN PATENT DOCUMENTS

| JP | 61-279071 A | 12/1986 |
| JP | 2002-313394 A | 10/2002 |
| WO | WO 2004/049490 A2 * | 6/2004 |

* cited by examiner

*Primary Examiner*—Dah-Wei Yuan
*Assistant Examiner*—Angela J. Martin
(74) *Attorney, Agent, or Firm*—Foley & Lardner LLP

(57) ABSTRACT

At system shutdown, supply of hydrogen to a fuel electrode of a fuel cell stack is stopped, and at the same time dry air is supplied to an oxidant electrode. The dry air is subsequently supplied also to the fuel electrode, and finally the system is shut down. This allows optimal conditioning of a fuel cell at system shutdown, and effectively suppresses deterioration of a proton exchange membrane or a catalyst layer of the fuel cell which is caused at system shutdown as well as during storage. Furthermore, a fuel cell system excellent in safety and the like can be provided.

18 Claims, 3 Drawing Sheets

FUEL CELL SYSTEM

TECHNICAL FIELD

The present invention relates to a fuel cell system including fuel cells, and more particularly, to an improvement in control during a system shutdown.

BACKGROUND ART

As a countermeasure to recent environmental problems, especially to air pollution caused by automobile exhaust gas and global warming stemming from carbon dioxide emissions, much attention is focused on fuel cell technology which achieves clean exhaust emissions and offers high energy efficiency. A fuel cell is an energy conversion system in which hydrogen or hydrogen-rich reformed gas as fuel is supplied together with air to an electrolyte/electrode catalyst composite to cause an electrochemical reaction so that chemical energy is converted to electrical energy. In particular, a solid polymer electrolyte fuel cell that uses a proton exchange membrane as an electrolyte is inexpensive and easily reducible in size, and further has high power density, therefore, applications to power sources of mobile objects such as automobiles is highly expected.

In this solid polymer electrolyte fuel cell, a proton exchange membrane functions as an ion conductive electrolyte when saturated with water, and also has a function of separating hydrogen and oxygen from each other. Low water content in the proton exchange membrane leads to increased ion resistance and causes mixing of hydrogen and oxygen, resulting in failed generation of electricity as a fuel cell. Meanwhile, when hydrogen ions separated at a hydrogen electrode pass through the proton exchange membrane by generation of electricity, water in the proton exchange membrane also moves, and therefore the proton exchange membrane on the hydrogen electrode side tends to dry. Furthermore, if the amount of water vapor contained in supplied hydrogen or air is small, the proton exchange membrane tends to dry near the inlets of the respective reaction gases.

From these reasons, the proton exchange membrane of the solid polymer electrolyte fuel cell needs to be positively humidified by supplying water thereto from outside, and hence some kind of humidification means is provided to humidify the electrolyte itself or to humidify hydrogen and air to be supplied. When water still remains in a fuel cell after system shutdown, however, it freezes depending on ambient temperatures, which may lead to difficulty in smooth starting of the system or to deterioration of the proton exchange membrane and the like. Accordingly, conditioning of the inside of a fuel cell is necessary at the time of system shutdown.

U.S. Pat. No. 6,635,370 and Japanese Patent Application Laid-Open No. 2002-313394 propose various methods for conditioning a fuel cell at system shutdown. According to U.S. Pat. No. 6,635,370, 0.0001% to 4.0% of hydrogen is maintained within a fuel cell at system shutdown in order to suppress deterioration of the proton exchange membrane which is caused at the time of system shutdown or during storage. Furthermore, according to Japanese Patent Application Laid-Open No. 2002-313394, a humidifier and a dehumidifier are provided to dry the membrane within a fuel cell by using the dehumidifier before system shutdown so that the fuel cell system can be started even below the freezing point.

DISCLOSURE OF INVENTION

As disclosed in Japanese Patent Application Laid-Open No. 2002-313394, however, when the fuel cell system shuts down in a state that hydrogen and air still remain in the fuel electrode and the oxidant electrode, respectively, of the fuel cell, a catalyst layer is disadvantageously deteriorated because the fuel cell is maintained at a high electrical potential or because air comes into the fuel electrode from inside and outside the fuel cell. This problematic phenomenon can be suppressed to a certain extent by maintaining hydrogen both in the fuel electrode and the oxidant electrode, as disclosed in U.S. Pat. No. 6,635,370. However, such a method sometimes is not suitable for a compact distributed power source for automobiles and the like, from a safety standpoint and when the storage period is long.

It is, therefore, an object of the present invention to provide a fuel cell system that can effectively suppress deterioration of a proton exchange membrane or a catalyst layer of a fuel cell which is caused at system shutdown as well as during storage, by carrying out optimal conditioning of the fuel cell at system shutdown, and that is also excellent in safety.

The fuel cell system according to the present invention includes a fuel cell that generates electricity by causing an electrochemical reaction between a fuel gas and an oxidant gas, the fuel gas being supplied from a fuel gas supply system to a fuel electrode of the fuel cell, and the oxidant gas being supplied from an oxidant gas supply system to an oxidant electrode of the fuel cell. The oxidant gas supplied from the oxidant gas supply system can be humidified by humidification means, and can be supplied also to the fuel electrode of the fuel cell through communication means. In order to achieve the object, thus configured fuel cell system of the present invention performs control to stop supplying the fuel gas to the fuel electrode at the time of system shutdown, then to supply to the oxidant electrode an oxidant gas which is drier than that supplied for normal electricity generation, to subsequently supply the drier oxidant gas also to the fuel electrode through the communication means, and finally to shut down the system.

As described above, by utilizing the fact that less water content in a catalyst layer on the oxidant electrode side of a fuel cell results in less deterioration of the catalyst layer caused when operation of the fuel cell is stopped, the fuel cell system according to the present invention first stops supplying the fuel gas to the fuel electrode of the fuel cell at system shutdown and at the same time starts supplying a dry oxidant gas such as air (the same or lower humidity than that of the outside air) to the oxidant electrode, so as to reduce the water content in the catalyst layer of the oxidant electrode side. The fuel cell system of the present invention thereafter stops operations after supplying the oxidant gas such as air also to the fuel electrode to replace the fuel gas in the fuel electrode with the oxidant gas, so that deterioration caused at system shutdown as well as during storage can be suppressed.

According to the fuel cell system of the present invention, the supply of a fuel gas to the fuel electrode of the fuel cell is stopped at system shutdown, and at the same time the supply of a dry oxidant gas to the oxidant electrode is started, and subsequently this dry oxidant gas is supplied also to the fuel electrode before the system operation is stopped. This can effectively suppress deterioration of the proton exchange membrane and catalyst layer of the fuel cell which is caused at the time of system shutdown or during storage, and also improve handleability during storage.

Other and further features, advantages, and benefits of the present invention will become more apparent from the following description taken in conjunction with the following drawings.

BEST MODE FOR CARRYING OUT THE INVENTION

Specific embodiments of a fuel cell system to which the present invention is applied will be explained below with reference to the accompanying drawings.

First Embodiment

Figure 1:
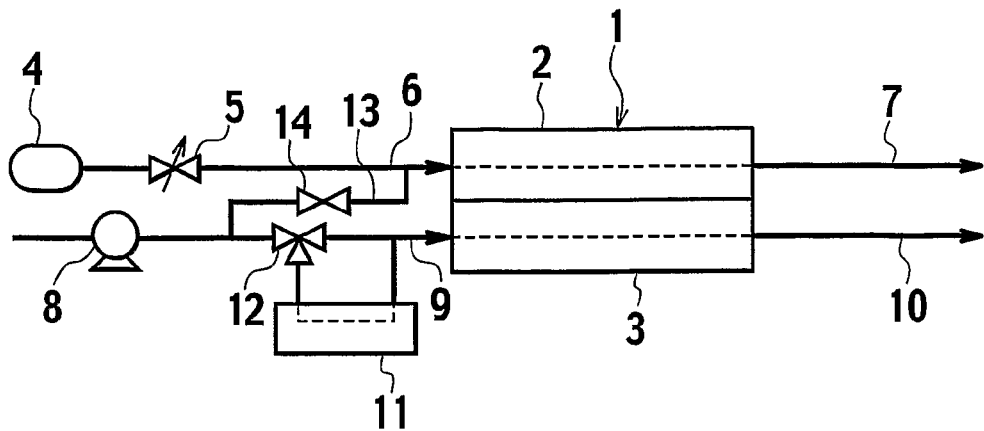
FIG. 1 is a diagram showing a schematic configuration of a fuel cell system according to a first embodiment.

FIG. 1 is a diagram showing a schematic configuration of a fuel cell system according to a first embodiment to which the present invention is applied.

The fuel cell system according to this embodiment includes a fuel cell stack 1 formed by stacking a plurality of fuel cells each of which uses, for example, a proton exchange membrane as an electrolyte. Each cell that constitutes the fuel cell stack 1 has a fuel electrode 2 as an anode and an oxidant electrode 3 as a cathode, and generates electricity when a fuel gas of hydrogen is supplied from a fuel gas supply system to the fuel electrode 2 and an oxidant gas of air is supplied from an oxidant gas supply system to the oxidant electrode 3.

The fuel gas supply system has, for example a fuel tank 4 in which hydrogen is stored, and delivers hydrogen in the fuel tank 4 via a fuel supply amount regulating valve 5 through a fuel gas supply pipe 6 into the fuel cell stack 1 so as to supply hydrogen to the fuel electrode 2 of each cell. Redundant fuel gas unconsumed in the fuel electrode 2 of each cell is discharged from the fuel cell stack 1 through a fuel gas exhaust pipe 7 to the outside after it is diluted to fall within a predetermined range of concentrations.

The oxidant gas supply system has a blower 8 for forcibly feeding air under pressure, and by driving this blower 8, the oxidant gas supply system delivers air through an oxidant gas supply pipe 9 to the fuel cell stack 1 so as to supply air to the oxidant electrode 3 of each cell. Means for regulating the supply amount of air as oxidant gas may be provided at some midpoint of the oxidant gas supply pipe 9. The air that has passed through the oxidant electrode 3 of each cell is discharged from the fuel cell stack 1 through an oxidant gas exhaust pipe 10 to the outside.

The oxidant gas supply pipe 9 branches at the midway part thereof and a humidifier 11 is disposed in the middle of this branched pipe. Furthermore, at the branch point of the oxidant gas supply pipe 9, a three-way valve 12 is provided which is operable to switch an air flow between a channel for passing through the humidifier 11 and a channel for bypassing the humidifier 11 in order to humidify or dehumidify the air.

In the fuel cell system according to this embodiment, a fuel electrode oxidant gas supply pipe 13 is provided between the front stage of the three-way valve 12 in the oxidant gas supply pipe 9 and the fuel gas supply pipe 6 so as to connect therebetween. At the midway position of this fuel electrode oxidant gas supply pipe 13, a switching valve 14 is provided, and when it is opened, air forcibly fed by driving power of the blower 8 of the oxidant gas supply system is delivered through the fuel electrode oxidant gas supply pipe 13 to the fuel gas supply pipe 6 of the fuel gas supply system, so as to supply the air to the fuel electrode 2 of each cell in the fuel cell stack 1. That is, in the fuel cell system according to this embodiment, the fuel electrode oxidant gas supply pipe 13 and the switching valve 14 both function as communication means for switchably connecting and disconnecting between the fuel gas supply system and the oxidant gas supply system in an open/closed manner.

Figure 2:
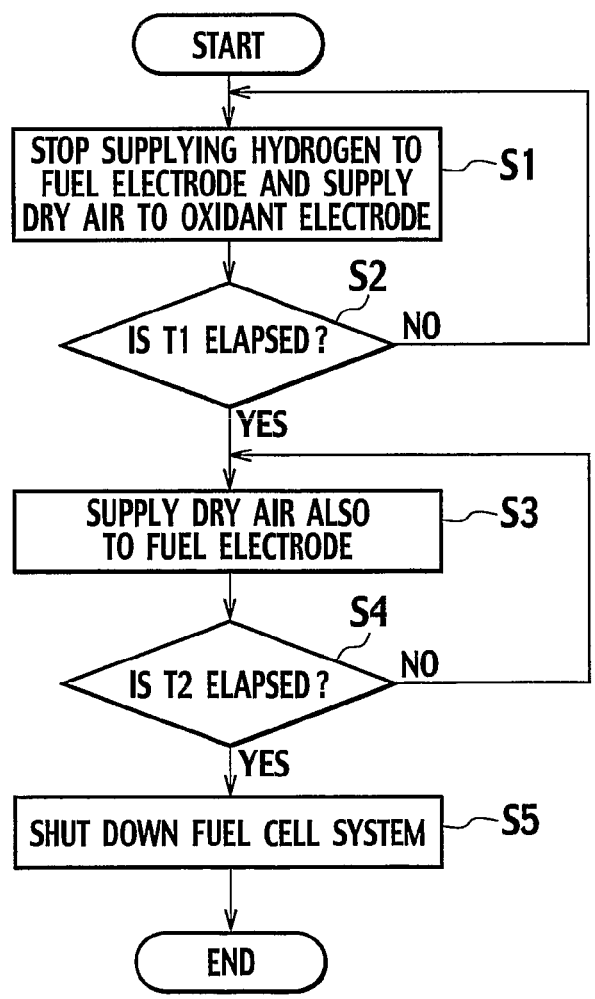
FIG. 2 is a flowchart showing control flow steps taken at the time of shutdown of the fuel cell system according to the first embodiment.

According to thus configured fuel cell system, operational control for each component unit of the fuel gas supply system and the oxidant gas supply system as well as control for utilizing electricity from the fuel cell stack 1 are executed based on instructions from a system controller (not shown). In particular, the fuel cell system to which the present invention is applied has its feature in its control executed based on instructions from the system controller at the time of system shutdown, and is so designed as to effectively suppress deterioration, which is caused at the time of system shutdown or during subsequent storage, in the proton exchange membrane of each cell that constitutes the fuel cell stack 1 or in the catalyst layers of the fuel electrode 2 and oxidant electrode 3. With reference to FIG. 2, the control made at the time of system shutdown, which is the feature of the fuel cell system according to this embodiment will be explained.

The fuel cell system in this embodiment executes control according to the flowchart shown in FIG. 2 when shutting down the system. First at step S1, the system controller blocks hydrogen fed from the fuel tank 4 by operating the fuel supply amount regulating valve 5 thereby cutting off the supply of hydrogen to the fuel electrode 2 of each cell in the fuel cell stack 1. At the same time, the system controller blocks the air flow to the humidifier 11 by operating the three-way valve 12 so that air forcibly fed by the blower 8 can be supplied to the fuel cell stack 1 in a totally dehumidified state. The system controller then drives the blower 8 at the maximum power to supply dry air at the maximum possible flow rate, to the oxidant electrode 3 of each cell in the fuel cell stack 1, so as to dry the catalyst layer of the oxidant electrode 3.

Thereafter, the system controller counts the time during which the dry air is supplied to the oxidant electrode 3, and when a predetermined time T1 elapses (step S2), the system controller opens the switching valve 14 provided in the fuel electrode oxidant gas supply pipe 13 to supply the dry air, which has been supplied to the oxidant electrode 3, also to the fuel electrode 2 in order to replace hydrogen in the fuel electrode 2 with the dry air (step S3). At this moment, for swifter replacement at the fuel electrode 2, the amount of air supplied to the fuel electrode 2 is desirably larger than that supplied to the oxidant electrode 3. Alternatively, the three-way valve 12 may be closed to cut off the supply of air to the oxidant electrode 3 in order to supply the whole amount of dry air to the fuel electrode 2. Next, the system controller also counts the time during which the dry air is supplied to the fuel electrode 2, and when a predetermined time T2 elapses and hydrogen in the fuel electrode 2 is completely replaced with air (step S4), the system controller stops the driving operation of the blower 8 to shut down the system (step S5).

As described above, in the fuel cell system according to this embodiment, at the time of system shutdown, the system controller stops the supply of hydrogen to the fuel electrode 2 of each cell, and starts the supply of dry air having the same or lower humidity than that of the outside air to the oxidant electrode 3, so that the inside of the catalyst layer of the oxidant electrode 3 is first dried. After the oxidant electrode 3 side is dried to a certain extent the system controller then supplies the dry air also to the fuel electrode 2 in the same manner as done for the oxidant electrode 3. Accordingly, hydrogen is replaced with air in a state that water within each cell of the fuel cell stack 1 is already reduced, which suppresses deterioration more greatly than when the replacement is made with much water still left in each cell. Furthermore, the system controller supplies the dry air to the oxidant electrode 3 as well as to the fuel electrode 2 thereby replacing hydrogen left in the fuel electrode 2 with the dry air, which effectively suppresses deterioration caused when hydrogen and air mix up during storage, and also eliminates the possibility of undesired generation of voltage during storage, thereby improving handleability during storage.

Second Embodiment

Figure 3:
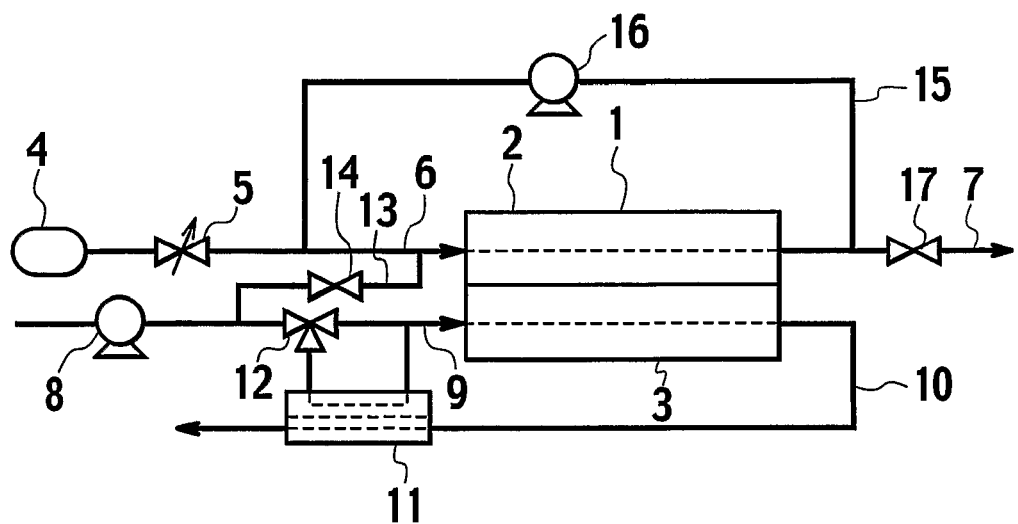
FIG. 3 is a diagram showing a schematic configuration of a fuel cell system according to a second embodiment.

FIG. 3 is a diagram showing a schematic configuration of a fuel cell system according to a second embodiment to which the present invention is applied.

The fuel cell system of this embodiment is configured as a fuel cell system employing a fuel circulation method of circulating and reusing redundant hydrogen discharged from the fuel cell stack 1, and is additionally provided with a fuel gas circulating pipe 15 that is used to circulate and reuse hydrogen, between the fuel gas exhaust pipe 7 and the fuel gas supply pipe 6 so as to connect the outlet side of the fuel electrode 2 with the inlet side thereof in the fuel cell stack 1. In the midway part of this fuel gas circulating pipe 15, a circulating pump 16 is disposed which is used to forcibly return, to the fuel gas supply pipe 6, redundant hydrogen unused for electricity generation in the fuel cell stack 1 and thus discharged therefrom. Furthermore, a switching valve 17 is provided downstream from the branch point of the fuel gas exhaust pipe 7 and the fuel gas circulating pipe 15, and when this switching valve 17 is closed, redundant hydrogen discharged from the fuel cell stack 1 is circulated without being discharged to the outside. This switching valve 17 is opened when there is a need to purge hydrogen, such as when impurity concentration in the fuel gas circulated for reuse increases or when the fuel cell system is shut down.

The oxidant gas exhaust pipe 10 is connected to the humidifier 11 in order to collect water from the air that is discharged from the fuel cell stack 1 while containing much water vapor by passing through the oxidant electrode 3. The water in the air discharged from the fuel cell stack 1 is collected in the course of passing through the humidifier 11, and is used to humidify air to be supplied to the inlet side of the oxidant electrode 3 of the fuel cell stack 1. In the end, the resultant dry air from which water is collected is discharged to the outside air. Other components of the fuel cell system in this embodiment are the same as those in the first embodiment.

The fuel cell system according to this embodiment also executes basically the same control as that described in the first embodiment according to the flowchart shown in FIG. 2 when the system is shut down. There is, however, a difference in that in this embodiment, when the supply of hydrogen to the fuel electrode 2 is stopped at step S1, hydrogen from the fuel tank 4 is blocked by operating the fuel supply amount regulating valve 5, and also the circulating pump 16 is deactivated to cut off the flow of hydrogen supplied in a circulatory manner through the fuel gas circulating pipe 15 to the inlet side of the fuel electrode 2. Other control steps are the same as those in the first embodiment, that is, the system controller supplies dry air to the oxidant electrode 3 at the same time when stopping the supply of hydrogen to the fuel electrode 2 at step S1, and when the predetermined time T1 elapses (step S2), the system controller supplies the dry air also to the fuel electrode 2. When the predetermined time T2 elapses (step S4), the system controller then shuts down the system (step S5).

In the fuel cell system according to this embodiment, in the same manner as described in the first embodiment, at the time of system shutdown, the system controller first stops the supply of hydrogen to the fuel electrode 2 and at the same time starts the supply of dry air to the oxidant electrode 3, subsequently supplies the dry air also to the fuel electrode 2, and finally stops the operation of the fuel cell stack 1. This can effectively suppress deterioration caused at system shutdown or during storage, and advantageously improve handleability during storage. In particular, since the fuel cell system of this embodiment is designed to employ a fuel circulation method, hydrogen utilization efficiency in the fuel cell stack 1 during the operation thereof is improved, and simultaneously the same advantageous effect as in the first embodiment can be obtained.

Figure 4:
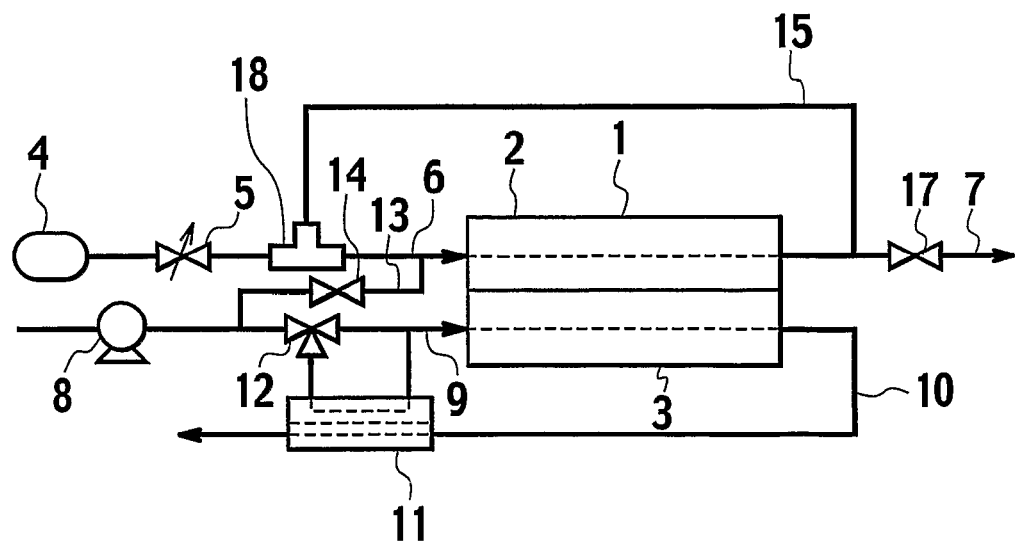
FIG. 4 is a diagram showing a modification example of the fuel cell system according to the second embodiment.

While in the above explanation, the circulating pump 16 is used as means for forcibly returning redundant hydrogen discharged from the fuel cell stack 1 to the fuel gas supply pipe 6, instead of disposing the circulating pump 16 in the fuel gas circulating pipe 15, an ejector 18 may be provided at the junction point of the fuel gas supply pipe 6 and the fuel gas circulating pipe 15 to forcibly return the redundant hydrogen discharged from the fuel cell stack 1 to the fuel gas supply pipe 6 by operating this ejector 18, as shown in FIG. 4. Alternatively, the circulating pump 16 and the ejector 18 may be used in combination so that, for example, a pressure range, at which the ejector 18 does not function, is complemented by the operation of the circulating pump 16.

Third Embodiment

Figure 5:
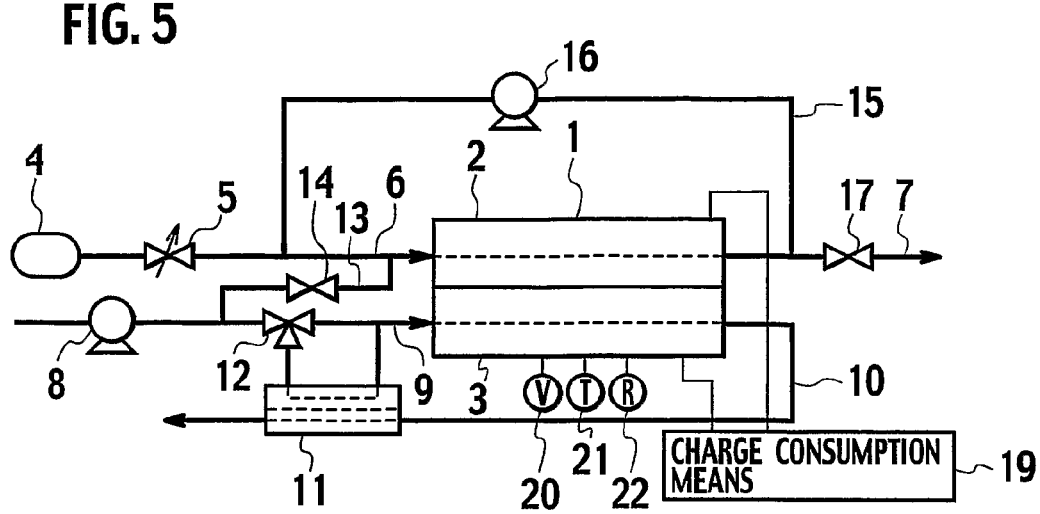
FIG. 5 is a diagram showing a schematic configuration of a fuel cell system according to a third embodiment.

FIG. 5 is a diagram showing a schematic configuration of a fuel cell system according to a third embodiment to which the present invention is applied.

The fuel cell system in this embodiment has the configuration described in the second embodiment and additionally includes charge consumption means 19 for consuming electric charge generated in the fuel cell stack 1 during the operation of system shutdown, voltage detection means 20 for detecting voltage of the fuel cell stack 1, temperature detection means 21 for detecting temperature of cells that constitute the fuel cell stack 1, and resistance measurement means 22 for measuring resistance of cells that constitute the fuel cell stack 1. Other components of the fuel cell system in this embodiment are the same as those in the second embodiment.

The charge consumption means 19 is connected both to the end of the fuel electrode 2 and to the end of the oxidant electrode 3 through a switch (not shown). When this switch is turned ON based on instructions from the system controller, the charge consumption means 19 is electrically connected to the fuel cell stack 1 and then consumes electrical charge in each cell that constitutes the fuel cell stack 1. The voltage detection means 20, the temperature detection means 21, and the resistance measurement means 22 are respectively connected directly or indirectly to the fuel cell stack 1, and measure the voltage, the cell temperature, and the cell resistance, respectively, of the fuel cell stack 1 to output the obtained information to the system controller. As cell temperature and cell resistance, the temperature and the resistance of a representative one of a large number of cells constituting the fuel cell stack 1 may be measured, or alternatively, the temperature and the resistance of each of a large number of cells may be measured to obtain the average values for use as cell temperature and cell resistance.

Figure 6:
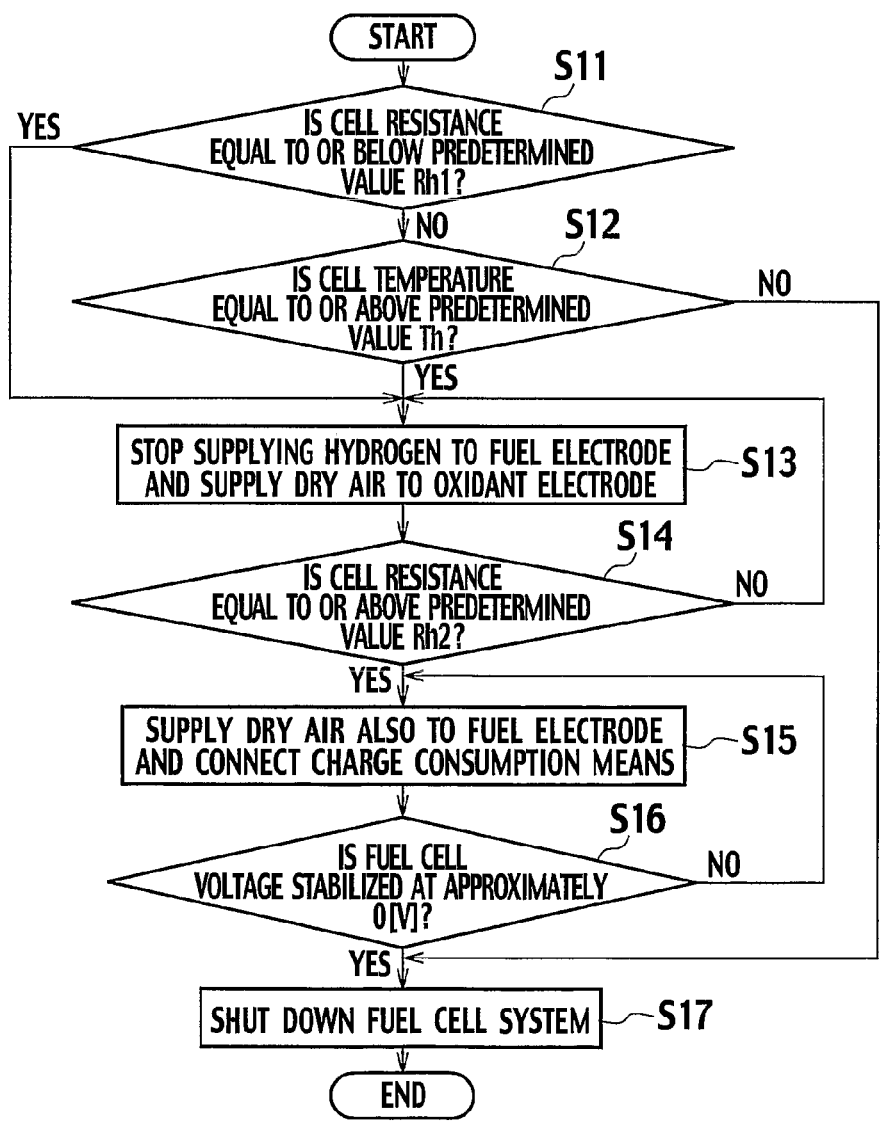
FIG. 6 is a flowchart showing control flow steps taken at the time of shutdown of the fuel cell system according to the third embodiment.

The fuel cell system according to this embodiment executes control according to the flowchart shown in FIG. 6 when shutting down the system. First at step S11, the system controller checks whether the cell resistance of the fuel cell stack 1 is a predetermined value Rh1 or below, based on the detection value of the resistance measurement means 21. When the cell resistance of the fuel cell stack 1 exceeds the predetermined value Rh1, the system controller checks at step S12 whether the cell temperature of the fuel cell stack 1 is a predetermined value Th or above, based on the detection value of the temperature detection means 21. When the determination result at step S11 or step S12 is "YES", the processing proceeds to step S13, whereupon the system controller executes control at step S13 and the subsequent steps.

On the other hand, when the cell resistance exceeds the predetermined value Rh1 at step S11, and at the same time when the cell temperature is below the predetermined value Th at step S12, the system controller determines that the system shutdown this time is, for example, made immediately after the system is started, and that there is thus no need to effect control for suppressing catalyst deterioration. Accordingly, the processing shifts to step S17 by skipping steps S13 to S16, described later, and the system controller shuts down the system immediately.

At step S13, the system controller executes the same processing as step S1 of the second embodiment, that is, blocks hydrogen from the fuel tank 4 by operating the fuel supply amount regulating valve 5, and also cuts off the flow of hydrogen supplied in a circulatory manner through the fuel gas circulating pipe 15 to the inlet side of the fuel electrode 2 by deactivating the circulating pump 16, so as to completely stop the supply of hydrogen to the fuel electrode 2 of the fuel cell stack 1. At the same time, the system controller cuts off the flow of air to the humidifier 11 by operating the three-way valve 12, and supplies the maximum possible flow rate of dry air to the oxidant electrode 3 of each cell in the fuel cell stack 1 by driving the blower 8 at the maximum power, thereby drying the inside of the catalyst layer of the oxidant electrode 3.

Subsequently at step S14, the system controller determines whether the cell resistance of the fuel cell stack 1 rises to or above a predetermined value Rh2, and the processing proceeds to the next step S15 when the cell resistance of the fuel cell stack 1 rises to or above the predetermined value Rh2. The cell resistance of the fuel cell stack 1 may be determined based on the detection value of the resistance measurement means 21 in the same manner as step S11, but it is alternatively possible to experimentally determine in advance a time required since the supply of dry air to the oxidant electrode 3 is started until the cell resistance rises to or above the predetermined value Rh2, and to determine that the cell resistance rises to or above the predetermined value Rh2 at the time when the experimentally derived predetermined time elapses.

At step S15, the system controller executes the same processing as step S3 of the second embodiment, that is, opens the switching valve 14 provided in the fuel electrode oxidant gas supply pipe 13, and supplies the dry air, which has been fed to the oxidant electrode 3, also to the fuel electrode 2 so as to replace hydrogen in the fuel electrode 2 with air. In this embodiment, simultaneously with this replacement operation, the charge consumption means 19 is connected to both the end of the fuel electrode 2 and the end of the oxidant electrode 3 of the fuel cell stack 1 and consumes electric charges generated therein, so that hydrogen still remaining in the fuel electrode 2 is positively consumed.

Next at step S16, the system controller determines whether the voltage of the fuel cell tack 1 is stabilized at or near 0V, based on the detection value of the voltage detection means 20. When the voltage of the fuel cell stack 1 is stabilized at approximately 0V, the system controller determines that hydrogen in the fuel electrode 2 is replaced with air, then deactivates the blower 8, and finally shuts down the system (step S17). It is desirable that the charge consumption means 19 connected to the fuel cell stack 1 at step S15 remains connected thereto even during storage after system shutdown.

As described above, also in the fuel cell system according to this embodiment, the same control is performed as in the first and second embodiments. That is, at the time of system shutdown, the system controller first stops the supply of hydrogen to the fuel electrode 2 and at the same time starts the supply of dry air to the oxidant electrode 3, subsequently supplies the dry air also to the fuel electrode 2, and finally stops the operation of the fuel cell stack 1. This can effectively suppress deterioration caused at system shutdown or during storage, and advantageously improve handleability during storage.

Furthermore, in the fuel cell system according to this embodiment, dry air is supplied to the oxidant electrode 3 of the fuel cell stack 1 to dry the inside of the catalyst layer of the oxidant electrode 3, and is supplied also to the fuel electrode 2 when cell resistance rises to or above a predetermined value, which can securely suppress deterioration caused when hydrogen in the fuel electrode 2 is replaced with air. When the supply of dry air to the fuel electrode 2 is started with experimentally determined timing when cell resistance rises to or above the predetermined value, the same advantageous effect can be obtained under simpler control.

Furthermore, in the fuel cell system according to this embodiment, when dry air is supplied to the fuel electrode 2 of the fuel cell stack 1 to replace hydrogen in the fuel electrode 2 with the dry air, the charge consumption means 19 is connected to the fuel cell stack 1 to positively consume hydrogen still remaining in the fuel electrode 2, so that the time required to replace hydrogen in the fuel electrode 2 with air is greatly reduced, thereby further effectively suppressing deterioration caused at system shutdown.

Furthermore, in the fuel cell system according to this embodiment, the voltage of the fuel cell stack 1 is monitored during the deterioration suppressing operation at system shutdown, and the system is shut down after the voltage of the fuel cell stack 1 is stabilized at approximately 0V, so that the shutdown operation is completed securely without any unnecessary control.

Furthermore, in the fuel cell system according to this embodiment, at the time of system shutdown, the above described shutdown operation is performed only when cell resistance of the fuel cell stack 1 is the predetermined value Rh1 or below or when cell temperature of the fuel cell stack 1 is the predetermined value Th or above, and the system is immediately shut down without supplying dry oxidant gas to the oxidant electrode 3 and the fuel electrode 2 when cell resistance of the fuel cell stack 1 exceeds the predetermined value Rh1 and at the same time when cell temperature of the fuel cell stack 1 is less than the predetermined value Th. This can eliminate unnecessary control. That is, the fuel cell system of this embodiment performs the system shutdown operation only when deterioration suppressing effect is expected, so that unnecessary operations can be avoided, for example, immediately after the system is started.

The entire content of a Patent Application No. TOKUGAN 2004-269341 with a filing date of Sep. 16, 2004, is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

The present invention is applicable to processing for driving a vehicle driving motor by supplying a fuel gas and an oxidant gas to a fuel cell stack to generate electricity.

The invention claimed is:

1. A fuel cell system comprising:
a fuel cell that generates electricity by causing an electrochemical reaction between a fuel gas and an oxidant gas;
a fuel gas supply system that supplies the fuel gas to a fuel electrode of the fuel cell;
an oxidant gas supply system that supplies the oxidant gas to an oxidant electrode of the fuel cell;
humidification means for humidifying the oxidant gas;
communication means for switchably connecting and disconnecting between the fuel gas supply system and the oxidant gas supply system in an open/closed manner; and
control means for, at system shutdown, stopping supply of the fuel gas to the fuel electrode of the fuel cell and at the same time, starting a supply to the oxidant electrode of a drier oxidant gas that is drier than the oxidant gas supplied thereto for normal electricity generation, and subsequently supplying the drier oxidant gas also to the fuel electrode through the communication means, and finally shutting down the fuel cell system.

2. A fuel cell system comprising:
a fuel cell that generates electricity by causing an electrochemical reaction between a fuel gas and an oxidant gas;
a fuel gas supply system that supplies the fuel gas to a fuel electrode of the fuel cell;
an oxidant gas supply system that supplies the oxidant gas to an oxidant electrode of the fuel cell;
a humidification unit that humidies the oxidant gas;
a communication unit that switchably connects and disconnects between the fuel gas supply system and the oxidant gas supply system in an open/closed manner; and
a control unit that, at system shutdown, stops supply of the fuel gas to the fuel electrode of the fuel cell and at the same time, starts a supply to the oxidant electrode of a drier oxidant gas that is drier than the oxidant gas supplied thereto for normal electricity generation, and subsequently causes supply of the drier oxidant gas also to the fuel electrode through the communication unit, and finally shuts down the fuel cell system.

3. A fuel cell system according to claim 2, wherein the control unit controls the drier oxidant gas so that a supply flow rate of the drier oxidant gas supplied to the fuel electrode of the fuel cell is greater than that of the drier oxidant gas supplied to the oxidant electrode.

4. A fuel cell system according to claim 2, wherein the control unit controls a supply flow rate of the drier oxidant gas so that a flow rate of the drier oxidant gas supplied to the fuel electrode or the oxidant electrode of the fuel cell is a maximum possible flow rate of the oxidant gas supply system.

5. A fuel cell system according to claim 2, further comprising:
charge consumption unit, wherein
the control unit connects the charge consumption unit to both an end of the fuel electrode and an end of the oxidant electrode of the fuel cell while the drier oxidant gas is supplied at least to the oxidant electrode of the fuel cell.

6. A fuel cell system according to claim 2, wherein the control unit starts the supply of the drier oxidant gas to the fuel electrode after an experimentally derived predetermined time elapses since the supply of the drier oxidant gas to the oxidant electrode of the fuel cell is started.

7. A fuel cell system according to claim 2, further comprising:
a resistance measurement unit that detects resistance of cells that comprise the fuel cell, wherein
the control unit starts the supply of the drier oxidant gas to the fuel electrode when cell resistance obtained during the supply of the drier oxidant gas to the oxidant electrode reaches a predetermined value or above.

8. A fuel cell system according to claim 2, wherein the control unit monitors voltage of the fuel cell while operations for the system shutdown are performed, and when a voltage value is stabilized at approximately 0V, the control unit terminates operations for the system shutdown.

9. A fuel cell system according to claim 2, further comprising:
resistance measurement unit that detects resistance of cells that constitute the fuel cell, wherein
the control unit shuts down the fuel cell system without supplying the drier oxidant gas to the oxidant electrode and the fuel electrode of the fuel cell when cell resistance exceeds a predetermined value.

10. A fuel cell system according to claim 2, further comprising:
temperature measurement unit that detects temperature of cells that constitute the fuel cell, wherein
the control unit shuts down the fuel cell system without supplying the drier oxidant gas to the oxidant electrode and the fuel electrode of the fuel cell when cell temperature is below a predetermined value.

11. A fuel cell system according to claim 1, wherein the control means subsequently causes supply of the drier oxidant gas also to the fuel electrode through the communication means by opening a valve after the control means starts the supply to the oxidant electrode of the drier oxidant gas.

12. A fuel cell system according to claim 1, wherein the control means subsequently starts supplying the drier oxidant gas also to the fuel electrode through the communication means after the control means starts the supply to the oxidant electrode of the drier oxidant gas.

13. A fuel cell system according to claim 1, wherein
the control means subsequently causes supply of the drier oxidant gas also to the fuel electrode through the communication means after a predetermined time elapses during which the control means supplies the drier oxidant gas to the oxidant electrode.

14. A fuel cell system according to claim 1, wherein
the control means subsequently starts supplying the drier oxidant gas also to the fuel electrode through the communication means after a predetermined time elapses during which the control means supplies the drier oxidant gas to the oxidant electrode.

15. A fuel cell system according to claim 2, wherein
the control unit subsequently causes supply of the drier oxidant gas also to the fuel electrode through the communication unit by opening a valve after the control unit starts the supply to the oxidant electrode of the drier oxidant gas.

16. A fuel cell system according to claim 2, wherein
the control unit subsequently starts supplying the drier oxidant gas also to the fuel electrode through the communication unit after the control unit starts the supply to the oxidant electrode of the drier oxidant gas.

17. A fuel cell system according to claim 2, wherein
the control unit subsequently causes supply of the drier oxidant gas also to the fuel electrode through the communication unit after a predetermined time elapses during which the control unit causes supply of the drier oxidant gas to the oxidant electrode.

18. A fuel cell system according to claim 2, wherein
the control unit subsequently starts supplying the drier oxidant gas also to the fuel electrode through the communication unit after a predetermined time elapses during which the control unit causes supply of the drier oxidant gas to the oxidant electrode.

* * * * *